(12) United States Patent
Athans et al.

(10) Patent No.: US 7,097,429 B2
(45) Date of Patent: Aug. 29, 2006

(54) SKIRTED TURBINE BLADE

(75) Inventors: Robert Edward Athans, Cincinnati, OH (US); William Charles Herman, Blue Ash, OH (US); Brian Alan Norton, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/889,837

(22) Filed: Jul. 13, 2004

(65) Prior Publication Data

US 2006/0013690 A1    Jan. 19, 2006

(51) Int. Cl.
*F01D 5/14* (2006.01)

(52) U.S. Cl. .................... 416/193 A; 416/239
(58) Field of Classification Search ............ 416/193 A, 416/239
See application file for complete search history.

(56) References Cited

U.S. PATENT DOCUMENTS

| | | | |
|---|---|---|---|
| 3,112,914 A | | 12/1963 | Wellman |
| 3,834,831 A | * | 9/1974 | Mitchell ...................... 416/95 |
| 4,936,749 A | | 6/1990 | Arrao et al. |
| 5,201,849 A | | 4/1993 | Chambers et al. |
| 5,369,882 A | * | 12/1994 | Dietz et al. ................. 29/889.1 |
| 5,388,962 A | | 2/1995 | Wygle et al. |
| 6,171,058 B1 | | 1/2001 | Stec |

FOREIGN PATENT DOCUMENTS

| | | |
|---|---|---|
| EP | 0 913 556 | 5/1999 |
| GB | 2127104 | 4/1984 |
| GB | 2194000 | 2/1988 |

OTHER PUBLICATIONS

GE Aircraft Engines, "Stage-two Turbine Blade," in public use and on sale in USA and world before Jun. 1, 2003, 7 figures.

* cited by examiner

*Primary Examiner*—Ninh H. Nguyen
(74) *Attorney, Agent, or Firm*—William S. Andes; Francis L. Conte

(57) ABSTRACT

A turbine blade includes an airfoil, platform, shank, and dovetail. The shank includes opposite forward and aft faces corresponding with leading and trailing edges of the airfoil, and opposite first and second sides corresponding with pressure and suction sides of the airfoil. The shank further includes lugs extending outwardly from the two sides, with a first lug having an inverted skirt extending outwardly toward the platform to join the shank aft face. The skirt cooperates with a seal body when mounted in the engine for reducing inter-blade leakage.

20 Claims, 5 Drawing Sheets

SKIRTED TURBINE BLADE

BACKGROUND OF THE INVENTION

The present invention relates generally to gas turbine engines, and, more specifically, to turbine blades therein.

In a gas turbine engine air is pressurized in a compressor and mixed with fuel in a combustor for generating hot combustion gases. Turbine stages extract energy from the combustion gases for powering the compressor and producing useful work.

A high pressure turbine (HPT) immediately follows the combustor and includes one or more rows of turbine rotor blades which extract energy from the gases for powering the compressor.

A multistage low pressure turbine (LPT) follows the HPT and includes additional rotor blades which also extract energy from the combustion gases for typically powering an upstream fan in a turbofan aircraft engine application.

In yet another configuration, an intermediate pressure turbine (IPT) is disposed between the HPT and the LPT and includes additional turbine stages which also extract energy from the combustion gases for producing additional work. In this configuration, the IPT may be joined to a low pressure or booster compressor disposed upstream from the high pressure compressor for providing power thereto. And, the LPT powers an external drive shaft which may be used for powering an electrical generator in a typical industrial gas turbine engine application.

Since the rotor blades of the HPT are subject to the hottest temperatures of the combustion gases and rotate at high speed they are subject to considerable thermal and centrifugal stresses during operation. In order to improve their life and durability, the HPT turbine blades are typically formed of superalloys, such as nickel-based metal, for their enhanced strength at elevated temperature.

The turbine blades typically include hollow airfoils having cooling circuits therein through which is circulated cooling air bled from the compressor during operation. The blades also include an integral platform which defines the inner boundary for the hot combustion gases, with an integral supporting dovetail being disposed therebelow.

The blade dovetail includes one or more pairs of dovetail tangs or lobes which are mounted in corresponding dovetail slots in the perimeter of the supporting turbine rotor disk. Axial-entry dovetails are common and extend through axial dovetail slots disposed around the perimeter of the rotor disk.

Centrifugal loads generated during operation of the rotating blades are carried radially inwardly through the dovetail lobes into the corresponding disk posts which define the dovetail slots around the perimeter of the rotor disk. Since the blade airfoil, platform, and dovetail are specifically configured for different purposes they experience different thermal and centrifugal loads during operation which must be suitably limited for ensuring a long useful life of the turbine stage.

Correspondingly, the supporting rotor disks must also be suitably configured for carrying the centrifugal loads from the row of rotor blades with limited stress for ensuring the long useful life thereof as well.

Since the blade dovetails are discrete components spaced apart around the perimeter of the rotor disk and separated from each other by the intervening disk posts, corresponding inter-blade spaces or voids are created which must be suitably sealed during operation. Hot combustion gases flow between the blades during operation outside the blade platforms. And, cooling air bled from the compressor is channeled through the disk slots and through cooling channels extending radially through the individual rotor blades.

Accordingly, individual seal bodies are typically configured to fill the inter-blade voids between adjacent dovetails and above the corresponding disk posts therebetween. The seal bodies limit the leakage between the forward and aft faces of the blades when mounted to the perimeter of the rotor disk. These seals also control the operating temperature of the disk posts for maximizing the useful life of the rotor disk.

Turbine efficiency is affected by many interrelated parameters. Fundamentally, turbine efficiency may be increased as combustion gas temperature increases, but hotter combustion gases increase the heat loads on the turbine components which must be suitably cooled. Bleeding cooling air from the compressor in turn reduces efficiency of the engine since the bleed air is not used in the combustion process.

Furthermore, the aerodynamic profiles of the turbine blades themselves affect engine efficiency, and the airfoil configuration also affects thermal and centrifugal loads and stresses not only in the airfoils themselves but also in the supporting platforms, dovetails, and rotor disk posts.

In a recent development of a three-spool industrial gas turbine engine having an HPT, IPT, and LPT for driving an electrical generator, engine efficiency is being increased by improving the 3-D aerodynamic configuration of the turbine airfoils in the second stage of the HPT, for example. Modem analysis tools are being used to refine the 3-D configuration of the second stage airfoil for improving the efficiency thereof, which blades experience a larger twist relative to the axial dovetails than conventionally found. Such axial dovetails have proven durability in conventional turbines and permit corresponding long life of the supporting rotor disk.

The increased twist or turning of the airfoil root or hub at the inner platform correspondingly changes the load paths to the axial dovetail which is not similarly twisted or turned about the radial axis.

The airfoil hub turning requires suitably inclined or angled axial splitlines between the adjacent platforms in the row of turbine blades. The blade platforms therefore are twisted relative to the supporting axial dovetail and affect the centrifugal load path therethrough as well as the collective configuration thereof.

Since both the axial dovetail and inter-blade seal body are axisymmetrical the inter-blade spacing is affected by the 3-D airfoil and twisted platform which can lead to undesirable flow leakage between the blades.

Accordingly, it is desired to provide an improved turbine blade having a twisted platform joined to an axial dovetail with features for reducing inter-blade leakage.

BRIEF DESCRIPTION OF THE INVENTION

A turbine blade includes an airfoil, platform, shank, and dovetail. The shank includes opposite forward and aft faces corresponding with leading and trailing edges of the airfoil, and opposite first and second sides corresponding with pressure and suction sides of the airfoil. The shank further includes lugs extending outwardly from the two sides, with a first lug having an inverted skirt extending outwardly toward the platform to join the shank aft face. The skirt cooperates with a seal body when mounted in the engine for reducing inter-blade leakage.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
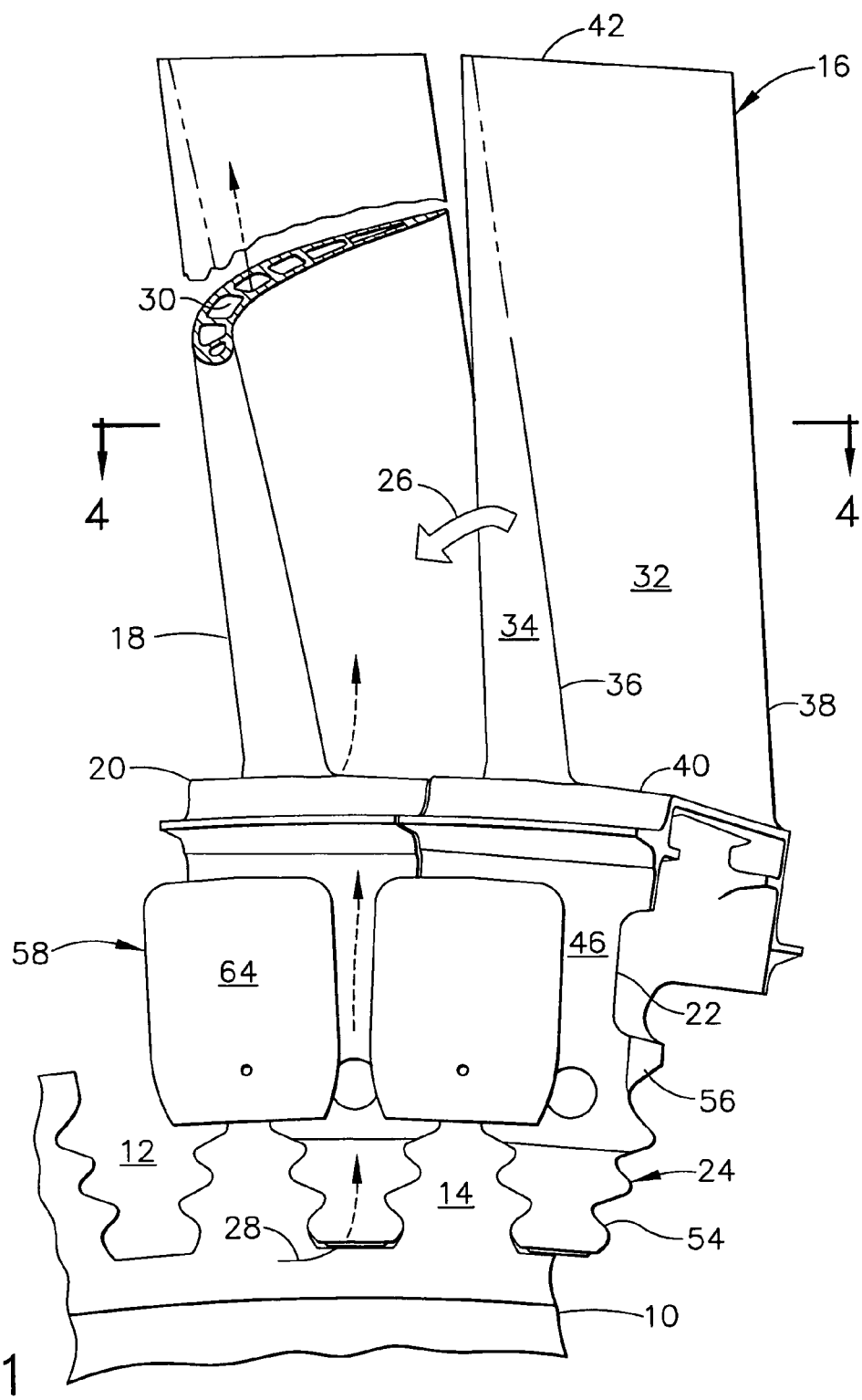
FIG. 1 is a forward-facing-aft elevational view of a portion of a second stage turbine rotor including rotor blades extending radially outwardly from a supporting rotor disk.

FIG. 1 illustrates a representative portion of a second stage turbine rotor of an HPT for an otherwise conventional gas turbine engine. The engine may be configured as a turbofan for powering an aircraft in flight, or for marine or industrial applications with an LPT driving an external drive shaft.

A turbine rotor disk 10, is shown in part and includes a row of axial dovetail slots 12 formed around the perimeter of the disk and defined by complementary disk posts 14.

A row of second stage turbine rotor blades 16 is mounted around the rotor disk in the corresponding dovetail slots 12. Each blade includes an airfoil 18, platform 20, shank 22, and multilobe dovetail 24 integrally joined together radially in turn in a unitary or one-piece casting.

During operation, hot combustion gases 26 are generated in a combustor (not shown) and are suitably channeled between the turbine airfoils 18 which extract energy therefrom for rotating the disk 10. The disk is suitably joined by a shaft to a multistage axial compressor (not shown) that pressurizes air 28 which is mixed with fuel in the combustor for generating the hot combustion gases.

A portion of the pressurized air 28 is suitably channeled to the rotor disk 10 and delivered in the disk slots 12 to the individual turbine blades for flow radially outwardly therethrough in cooling circuits 30 suitably formed therein during the casting process.

The individual airfoils 18 are therefore hollow and include suitable partitions or ribs therein for defining the various legs of the cooling circuit 30 for cooling the airfoil in any conventional manner. The cooling circuits include inlet channels which extend inwardly through the blade platform, shank, and dovetail, with inlets formed in the base of the dovetail for initially receiving the pressurized cooling air therein, also in a conventional manner.

Figure 2:
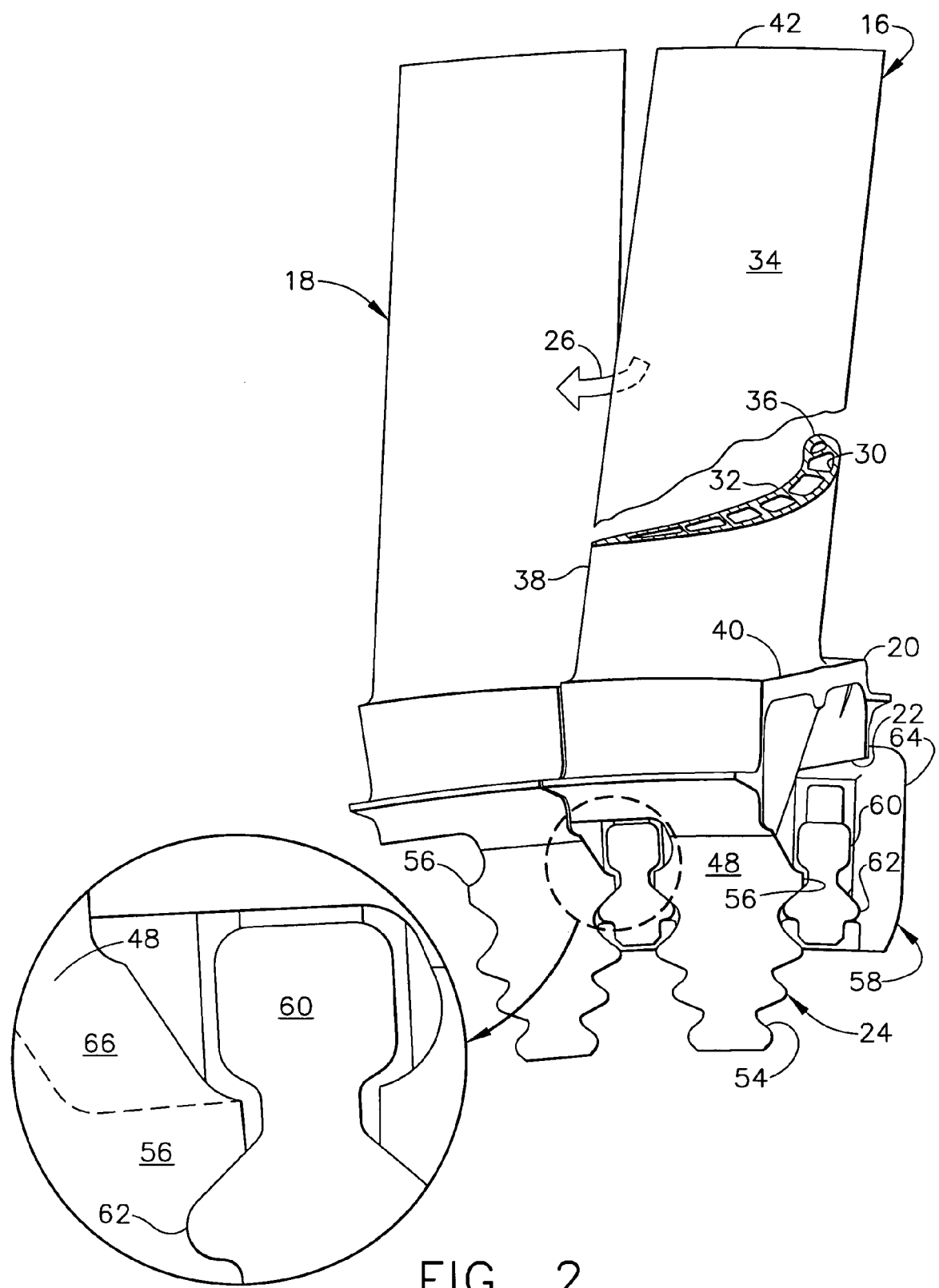
FIG. 2 is a aft-facing-forward elevational view of the turbine blades illustrated in FIG. 1.
Figure 3:
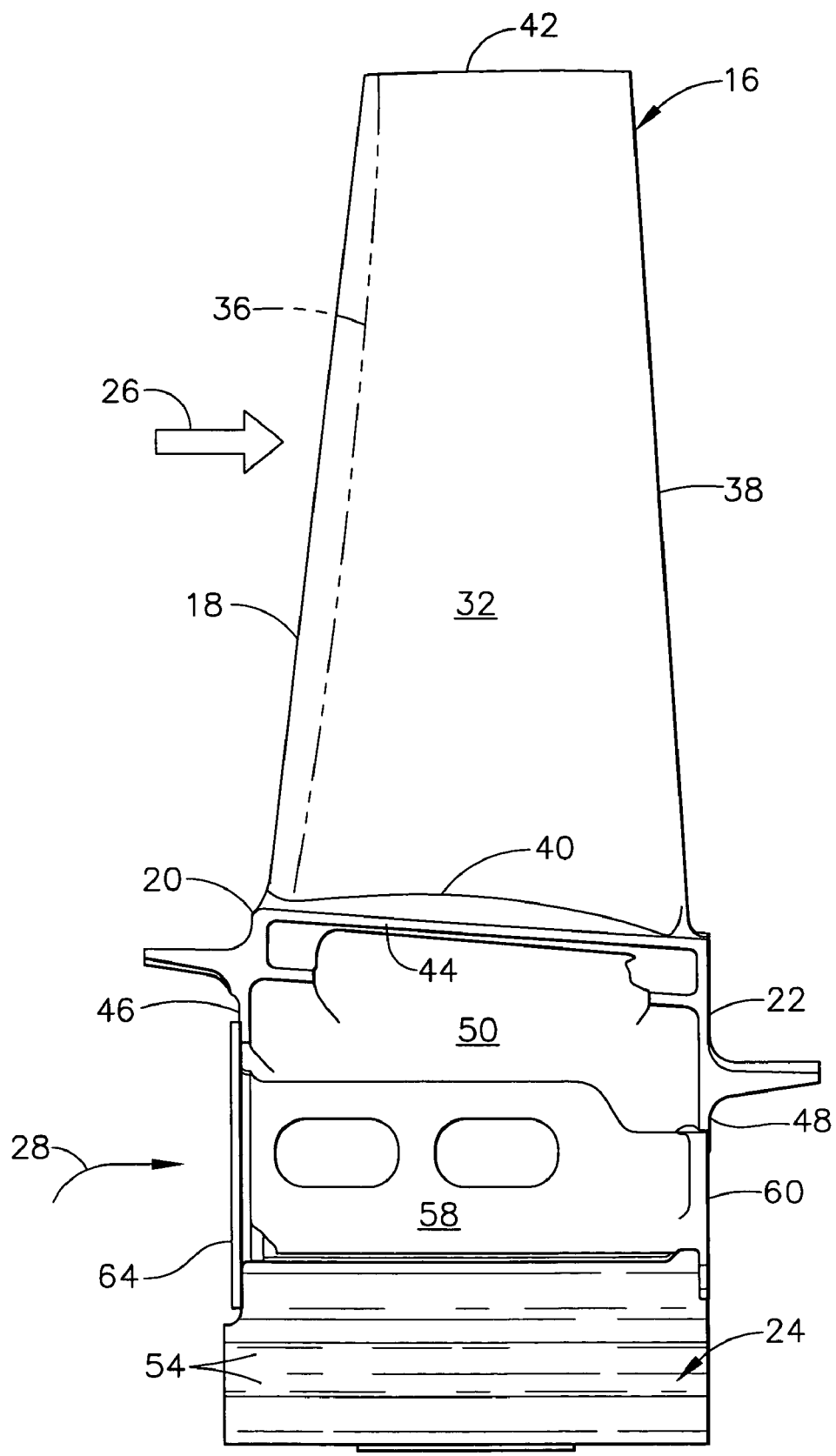
FIG. 3 is a side elevational or axial view of one of the turbine blades illustrated in FIGS. 1 and 2.

As shown in FIGS. 2 and 3, each airfoil 18 includes a generally concave pressure side 32 and a circumferentially or laterally opposite, generally convex suction side 34. The two sides extend axially in chord between opposite leading and trailing edges 36,38, and in longitudinal or radial span between a hub or root 40 integrally formed at the platform and an outer tip 42 at the distal end of the airfoil.

Except as described hereinbelow, the basic second stage turbine blade illustrated in FIGS. 1–3 is conventional in configuration and operation and is similarly found in commercial turbine engines sold and used for many years both in the U.S. and globally. As indicated above, further advances in efficiency of this stage-two turbine blade may be effected by improving the 3-D aerodynamic configuration of the airfoil 18.

Figure 4:
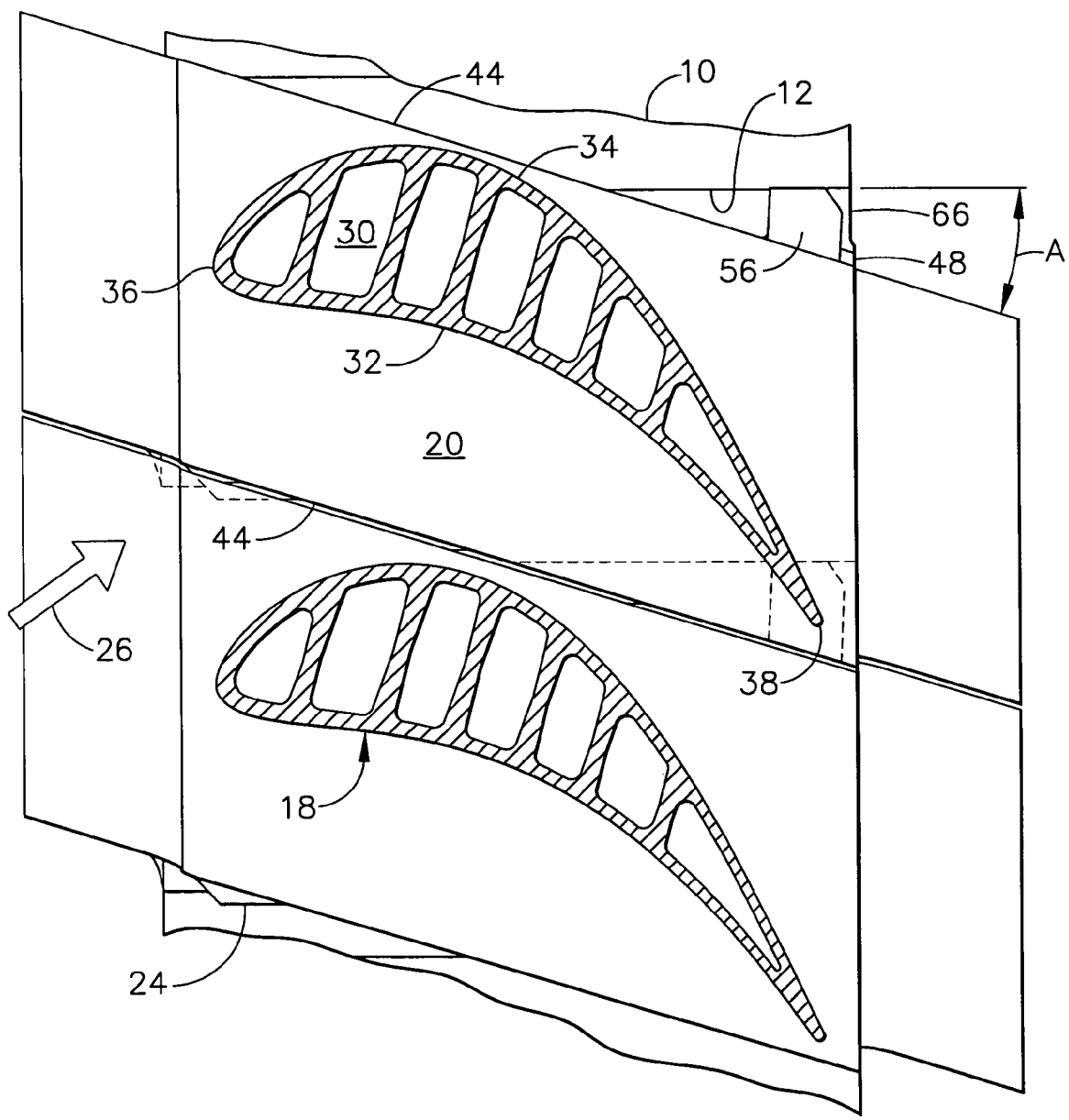
FIG. 4 is a partly sectional, planiform view of the two blades illustrated in FIG. 1 and taken along line 4—4.

More specifically, modem computational analysis may be used for improving the 3-D configuration of the airfoil 18 illustrated in FIGS. 1–3 to include, for example, increased turning or twist around the radial centerline or stacking axis of the airfoil. FIG. 4 illustrates in particular that the airfoil may be turned or twisted relative to the axial centerline axis of the rotor disk, which in turn twists or turns the corresponding platform 20.

Each platform has a pair of circumferentially opposite splitlines or slash faces 44 extending obliquely between the forward and aft faces thereof in a parallelogram configuration. Each platform 20 is twisted at an acute inclination or twist angle A, about 20 degrees for example, from the axial centerline axis of the disk or the axial dovetail of the blade itself. The twisted difference in orientation between the platform 20 and the underlying dovetail 24 affects both the centrifugal load path through the blade and the inter-blade spacing below the platform.

Figure 5:
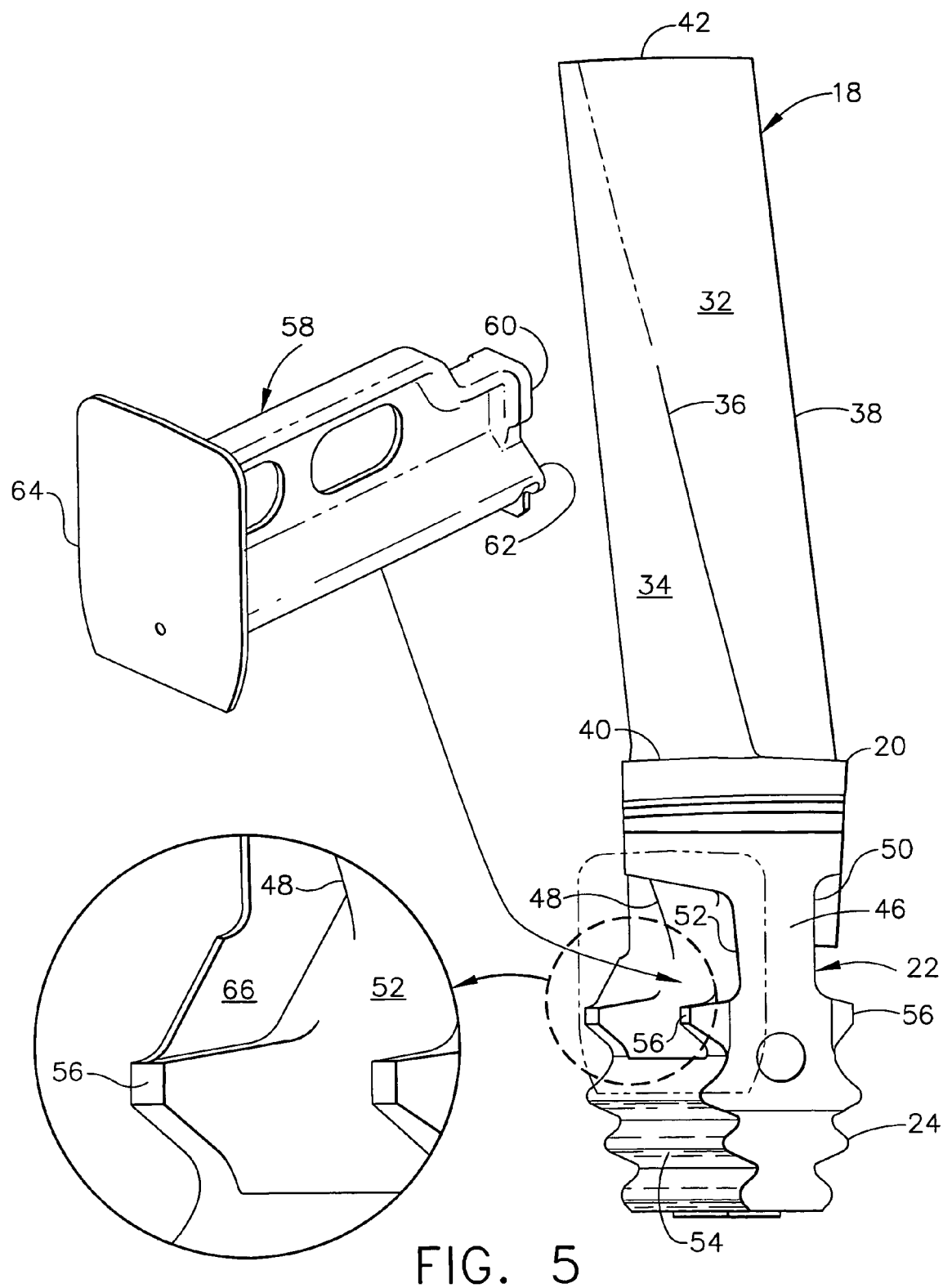
FIG. 5 is a forward-facing-aft exploded view of the turbine blade illustrated in FIG. 3.

More specifically, the shank 22 is illustrated in more detail in FIGS. 3 and 5 and includes axially opposite forward and aft faces 46,48 which correspond with the airfoil leading and trailing edges 36,38 and are disposed radially inwardly thereof. Each shank also includes laterally or circumferentially opposite first and second sides 50,52 which correspond with the airfoil pressure and suction sides 32,34, and are disposed radially therebelow. The shank extends radially in span and is integrally joined to the top of the dovetail 24.

The dovetail 24 illustrated in FIG. 5 has a conventional fir tree configuration with three pairs of axially extending tangs or lobes 54 which in turn extend in the axial direction below the corresponding forward and aft faces 46,48 of the radial shank 22.

Correspondingly, the shank includes four discrete supporting lugs 56 extending laterally outwardly from the opposite first and second sides 50,52 of the shank. The lugs are arranged in two pairs extending oppositely from the opposite sides of the shank at the corresponding forward and aft faces 46,48 thereof, and are spaced above the dovetail lobes 54.

As best shown in FIG. 5, each of the four lugs 56 includes a generally horizontal top surface and an inclined lower surface which blends with the outermost pair of dovetail lobes for radially supporting a seal plug or body 58 thereon.

As shown in FIGS. 2 and 5, the seal body 58 is axisymmetrical along its longitudinal or axial axis, and includes a generally rectangular head 60 disposed above a pair of axial lobes or tangs 62.

The seal body also includes an enlarged seal plate 64 disposed at a forward end thereof which laterally or circumferentially overlaps the forward faces 46 of adjacent shanks 22 as illustrated in FIG. 1 for providing an effective primary seal along the forward faces of the shank when mounted to the rotor disk.

Correspondingly, the head 60 and tangs 62 of the seal body 58 at the aft end thereof as illustrated in FIG. 2 are preferably disposed flush with the shank aft face 48 for providing a secondary seal between the aft faces of the shanks mounted to the disk. The intermediate portion of the seal body is suitably sized to fill the void or space between adjacent blade shanks to complete the sealing effectiveness thereof.

FIGS. 1–3 illustrate the installed location of the seal body 58 trapped between adjacent blade shanks. As shown in FIG.

2, the seal head 60 is disposed above the shank lugs 56, and the seal tangs 62 are disposed below the shank lugs 56 for engaging the inclined lower surfaces thereof.

During operation, centrifugal forces are exerted radially outwardly in the seal body 58 and are carried through the seal tangs 62 into the corresponding shank lugs 56, and join the centrifugal loads of the entire blade itself which are then carried through the dovetail lobes 54 into the corresponding lobes of the disk posts 14 illustrated in FIG. 1.

As shown in FIG. 1, the enlarged seal plate 64 effectively covers the inter-blade spacing over the entirety of the forward face of the blade shank between the platform 20 and the dovetail 24. In this way, high pressure cooling air or purge air in the forward cavity of the turbine along the forward face of the disk is sealed from leaking between the mounted blades. However, each seal plate 64 includes a small inlet aperture for metering a small amount of purge air between the blade shanks during operation to control the disk post temperature.

FIG. 2 illustrates the smaller aft end of the seal body 58, which does not include an enlarged duplicate seal plate 64 at the forward end. In view of the large hub turning as represented by the twist angle A illustrated in FIG. 4, a substantial circumferential offset is created between the turned platform and the axial dovetail as also illustrated in FIG. 2 which creates a nonsymmetrical clearance around the symmetrical head 60 of the seal body.

Accordingly, the one lug 56 of the four lugs which is exposed at the shank aft face 48 by turning of the blade platform 20 is specifically configured to include an integral inverted skirt 66 as illustrated in more detail in FIGS. 2 and 5. The inverted skirt 66 extends radially outwardly or upwardly toward the inner surface of the platform 20 to integrally join the shank aft face 48 along the second or suction side 52 of the shank.

Only this first one of the four lugs 56 is configured to include the inverted skirt 66, with the three remaining lugs being without corresponding skirts, and are therefore skirtless.

As best shown in FIG. 2, the suction-side first lug 56 at the shank aft face 48 is exposed from above due to the offset of the turned hub and platform of the blade. The inverted skirt 66 extends integrally from the first lug 56 to the shank second side 52 to form a sealing bridge therebetween. In this way, the nonuniform spacing around the symmetrical seal body head 60 illustrated in FIG. 2 is made substantially smaller by the introduction of the inverted skirt 66. The skirt therefore improves the secondary sealing at the aft end of the seal body 58 for additionally controlling the temperature of the disk posts for maintaining long disk life.

The unique platform turning illustrated in FIG. 4 creates the substantial offset with the suction-side of the dovetail and shank to expose from above the platform the first lug 56 and integral skirt 66. The turned platform ensures that the airfoil leading edge 36 is disposed generally over the shank second side 52, while the airfoil trailing edge 38 is disposed or aligned substantially over the shank first side 50.

The corresponding radial loadpath from the airfoil, platform, and shank into the dovetail limit the operational stresses therein, while ensuring a limit to the stresses in the supporting disk posts. The inverted skirt 66 may then be conveniently introduced for minimizing the clearance or gap surrounding the aft end of the seal body.

The inverted skirt 66 illustrated in FIGS. 2 and 5 preferably includes a terminal edge inclined from the distal end of the first lug 56 to the shank second side 52 at the aft face 48 to form a generally triangular sealing bridge therebetween.

Since the weight, and therefore centrifugal load, of the skirt itself must also be carried by the blade dovetail and disk posts, the size and weight of the skirt are preferably minimized in the triangular form while still effectively reducing the clearance or gap surrounding the symmetrical seal body 58.

As shown in FIG. 2, the seal body 58 is preferably symmetrical to symmetrically distribute the centrifugal loads therefrom into the adjacent blade dovetails. The symmetrical and generally rectangular head 60 is disposed above the first lug 56 closely adjacent to the inverted skirt 66, with the skirt reducing the gap relative to the first lug without inclusion of the inverted skirt.

As illustrated in FIGS. 1 and 2 the opposite forward and aft sides of the blade platform 20 include integral skirt portions extending radially from which extend axially conventional angel wing seals. The inverted skirt 66 may be conveniently formed as an integral part of the forward platform skirt as a radially inner extension thereof integrally joined to the first shank lug 56 located on the shank suction side 52 at the junction with the aft face 48 of the shank.

Accordingly, the introduction of the inverted blade skirt 66 while maintaining the symmetrical configuration of the seal body 58 allows for maintenance of a reasonable coolant leakage area in the shank and disk post region of each blade where there is a large difference between the platform slash face and dovetail angles. Considerable hub turning may be introduced at the root of the 3-D airfoil at the junction with the turned platform for increasing aerodynamic efficiency of the turbine blade while limiting undesirable flow leakage between the blade shanks due to the nonsymmetrical clearances around the symmetrical head of the seal body.

The seal body 58 illustrated in FIG. 5 is substantially conventional in configuration and operation, yet is suitably modified to accommodate the increase in turning angle A of the platform relative to the axial dovetail.

Since the trailing edge 38 of each airfoil illustrated in FIG. 4 is positioned closer to the suction side of the next blade due to the airfoil twist at the its root and corresponding twisting of the platform 20, the pressure side 50 of the shank illustrated in FIG. 3 is correspondingly displaced which reduces the available space for the aft end of the seal body between adjacent blade shanks. The aft hump in the seal body 58 illustrated in FIG. 3 may therefore be moved radially inwardly and axially forwardly sufficiently for accommodating the high turning of the blade platform and the corresponding blending of the axial dovetail provided by the bridging shank.

Accordingly, with minimal modification of the otherwise conventional seal body 58, and the introduction of the inverted skirt 66 at a single one of the four lugs 56 in each blade, the clearance around the aft end of the symmetrical seal body 58 may be substantially reduced while permitting the introduction of enhanced 3-D configuration of the blade airfoil with corresponding turning of the airfoil hub and supporting platform.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

The invention claimed is:

1. A turbine blade comprising:
   an airfoil, platform, shank, and dovetail integrally joined together in turn;

said airfoil being hollow and including opposite pressure and suction sides extending in chord between leading and trailing edges and in span between a root at said platform and an outer tip;

said shank including opposite forward and aft faces corresponding with said airfoil leading and trailing edges, and opposite first and second sides corresponding with said airfoil pressure and suction sides;

said dovetail including a plurality of lobes extending axially below said forward and aft faces of said shank; and said shank further includes four lugs extending oppositely from said shank first and second sides at said shank forward and aft faces, and spaced above said dovetail lobes, with a first one of said lugs having an inverted skirt extending outwardly toward said platform to join said shank aft face.

2. A blade according to claim 1 wherein said skirt extends integrally from said first lug to said shank second side to form a bridge therebetween.

3. A blade according to claim 2 wherein said platform is twisted at an acute twist angle from said dovetail to expose from above said platform said first lug and integral skirt.

4. A blade according to claim 3 wherein said airfoil leading edge is disposed over said shank second side, and said airfoil trailing edge is disposed over said shank first side.

5. A blade according to claim 4 wherein said skirt is inclined from a distal end of said first lug to said shank second side at said aft face to form a triangular bridge therebetween.

6. A blade according to claim 5 wherein each of said lugs includes an inclined lower surface for supporting a seal body thereon.

7. A blade according to claim 6 further comprising said seal body mounted between said dovetail and said lugs extending from said shank second side, and said seal body includes a head disposed above said first lug adjacent said inverted skirt.

8. A blade according to claim 7 wherein said seal body is axisymmetrical with said head being disposed above said shank lugs, and further including a pair of supporting tangs disposed below said shank lugs for engaging said lower surfaces thereof.

9. A blade according to claim 8 wherein said seal body further includes an enlarged seal plate disposed at a forward end thereof laterally overlapping said forward face of said shank.

10. A blade according to claim 9 wherein said head and tangs of said seal body are disposed flush with said shank aft face.

11. A turbine blade comprising:

an airfoil, platform, shank, and dovetail integrally joined together in turn;

said airfoil including opposite pressure and suction sides extending in chord between leading and trailing edges and in span between a root at said platform and an outer tip;

said shank including opposite forward and aft faces corresponding with said airfoil leading and trailing edges, and opposite first and second sides corresponding with said airfoil pressure and suction sides; and said shank further includes a plurality of lugs extending outwardly from said first and second sides thereof with a first one of said lugs having an inverted skirt extending outwardly toward said platform to join said shank aft face.

12. A blade according to claim 11 wherein said skirt extends integrally from said first lug to said shank second side to form a bridge therebetween.

13. A blade according to claim 12 wherein said platform is twisted at an acute twist angle from said dovetail to expose from above said platform said first lug and integral skirt.

14. A blade according to claim 13 wherein said skirt is inclined from a distal end of said first lug to said shank second side at said aft face to form a triangular bridge therebetween.

15. A blade according to claim 14 wherein:

said dovetail includes a plurality of lobes extending axially below said forward and aft faces of said shank; and four of said lugs extend oppositely from said first and second sides at said shank forward and aft faces and are spaced above said dovetail lobes.

16. A blade according to claim 15 wherein each of said lugs includes an inclined lower surface for supporting a seal body thereon.

17. A blade according to claim 16 further comprising said seal body mounted between said dovetail and said lugs extending from said shank second side, and said seal body includes a head disposed above said first lug adjacent said inverted skirt.

18. A blade according to claim 17 wherein said seal body is axisymmetrical with said head being disposed above said shank lugs, and further including a pair of supporting tangs disposed below said shank lugs for engaging said lower surfaces thereof.

19. A blade according to claim 18 wherein said seal body further includes an enlarged seal plate disposed at a forward end thereof laterally overlapping said forward face of said shank.

20. A blade according to claim 19 wherein said head and tangs of said seal body are disposed flush with said shank aft face.

* * * * *